INVENTOR.
MURDO A. MacDONALD
BY
Barney, Kivells, Raisch & Choate
ATTORNEYS

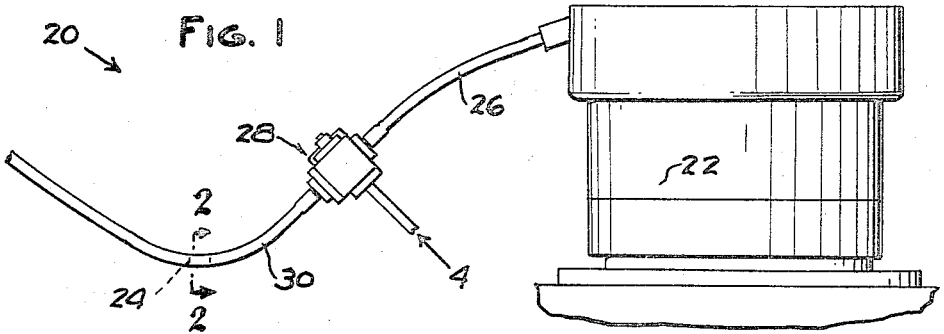
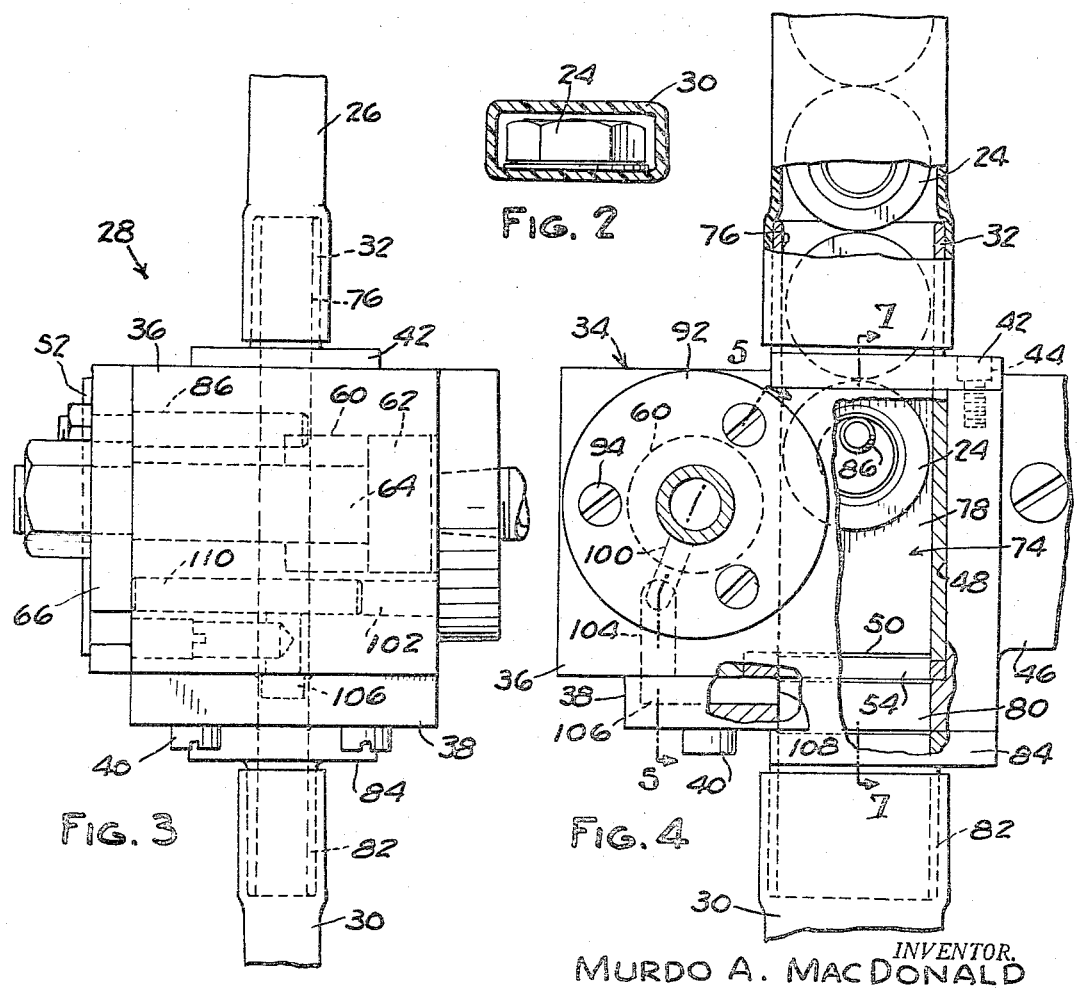

United States Patent Office 3,311,262
Patented Mar. 28, 1967

3,311,262
PLURAL TRANSVERSELY ACTING CONTROL-
LERS FOR RELEASING ARTICLES
Murdo A. MacDonald, Bloomfield Hills, Mich., assignor to Tru-Tork, Inc., Birmingham, Mich., a corporation of Michigan
Filed July 19, 1965, Ser. No. 472,841
10 Claims. (Cl. 221—299)

This invention relates generally to apparatus for feeding articles such as nuts, washers, and the like one at a time upon demand in a predetermined orientation from a source to a desired delivery point. The apparatus is especially well adapted for delivering articles from floor-level hoppers through tortuous paths to various kinds of equipment used in modern-day automated manufacturing lines, and the delivery point may be either moving or stationary.

It is conventional in certain industrial plants to gravity feed some parts which are easily orientable and easily fed, such as relatively large, heavy nuts, from overhead hoppers through rigid tracks to automated machinery. This system is objectionable in that the hoppers must usually be relatively high in the air, for example, 15' to 18' or more, which requires space-consuming supporting structure and also physical labor in carrying supplies of nuts to the hoppers. Because of frictional track resistance, these gravity-feed systems are in general unsatisfactory for feeding parts over relatively long distances or through curved paths; especially where the parts are small or light weight or of unusual shape which are hard to deliver in a predetermined attitude.

Some attempts have been made to feed parts to automated equipment by means of compressed air, but conventional article-feeding devices of this type have not been sufficiently reliable for use in continuous, relatively high-speed automated production lines wherein a single failure of the feeding device can result in shutting down the entire production line. A primary defect in conventional apparatus is that the articles being fed therethrough frequently tilt or cock and catch on surfaces defining the track or passageway involved and fail to reach the delivery point. Another difficulty lies in controlling the attitude of the articles. These two difficulties compound each other. A third difficulty is that under compressed-air delivery, the article sometimes attains too great a velocity, resulting in damage to the article, or the equipment to which it is delivered, on impact at the delivery point.

The general object of this invention is to provide a relatively simple, inexpensive feeder structure improved to deliver articles from a floor-level hopper in a predetermined attitude one at a time upon demand through a tortuous path, if required, to a delivery point which may be either moving or stationary and to function through thousands of successive cycles with sufficient reliability and rapidity to meet the demands of relatively high-speed, continuously-operating automated production lines.

Generally, the invention contemplates the use of a hopper-fed track which receives a series of the parts in a predetermined attitude. The track connects with a relatively short, straight guideway which extends downwardly to a pneumatic tube. A finger and a gate are mounted to reciprocate laterally of the passageway, and these two elements cooperate to form an escapement by which articles are dropped one at a time through the guideway into the pneumatic tube. The gate provides a transitional support for each article so that in each cycle of operation, an article moves only a short distance en route from the track to the tube. In addition, the gate pneumatically closes the guideway in its advanced position so that compressed air introduced into the guideway is contained and channeled through the tube to propel an article therein to a delivery point.

Relatively close tolerances are provided between the guideway and articles therein to control accurately the attitude of parts therein and prevent their tilting or cocking. The pneumatic tube has internal surfaces which also control the attitude of a part passing therethrough, but the tolerances between the tube surfaces and article are relatively great. This enables the tube to be curved relatively sharply without binding against an article therein and also enables propelling air to escape past an article to avoid accelerating the article to a dangerous velocity. One form of the invention is illustrated in the accompanying drawings.

FIG. 1 is a generally diagrammatic side elevation of a feeding system incorporating the present invention.

FIG. 2 is an enlarged, generally sectional view on line 2—2 of FIG. 1.

FIG. 3 is, in general, an enlarged side view of the feeding mechanism with parts shown in phantom to illustrate structural details.

FIG. 4 is, in general, a plan view looking in the direction of arrow 4 of FIG. 1 with parts shown in phantom and in section to illustrate structural details.

Figure 5:
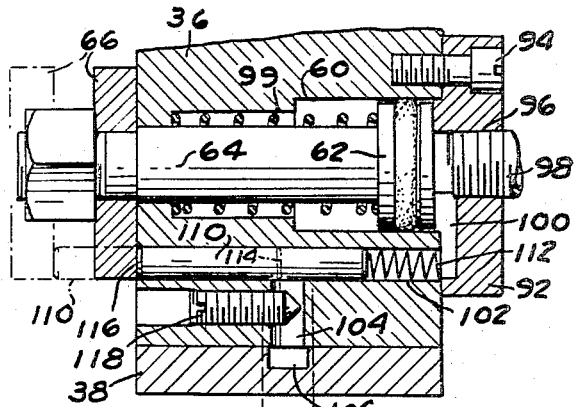
FIG. 5 is a sectional view on line 5—5 of FIG. 4.

Shown in the drawings is a feeding system 20 incorporating the present invention and including a hopper 22 which introduces a series of articles 24 in a predetermined attitude into a track 26. Track 26 is connected to a feeder device 28 which transfers articles one at a time upon demand into a pneumatic tube 30 and introduces air under pressure into the tube for propelling an article therein to a delivery point. The articles are maintained in their predetermined attitude during their transfer into tube 30 and while they are travelling therethrough.

Hopper 22 is illustrated as being of the vibratory type, although the system is equally well adapted to the use of other types of hoppers, such as rotary types and oscillating types. In the apparatus illustrated, track 26 comprises a flexible tube connected to the hopper and to a substantially rigid inlet nipple 32 formed on the body 34 of feeder device 28. The use of flexible tube 26 is particularly advantageous in connection with the vibratory hopper shown, since the hopper must be left free to vibrate unobstructedly in order to function properly. Tube 26 can have the same sectional configuration as tube 30 (FIG. 2), the features of which are discussed in detail below. A suitable material for tubes 26 and 30 is a plastic material marketed under the name Tygon.

Feeder body 34 includes a block 36 and an L-shaped bracket 38, secured together as by bolting 40, and a cap 42 secured to the bracket by bolting 44. Inlet nipple 32 comprises an extension of cap 42. Bracket 38 is provided with an extension 46 adapted to be connected to a suitable support (not shown).

Body members 36, 38, and 42 cooperate to define internal slotting 48 and 50. A plate 52 is slidably disposed within slot 48 and a gate 54 is slidably disposed in slot 50. Plate 52 and gate 54 are connected together by interengaged lugs and slots as represented at 56 (FIG.

9). Gate 54 has an opening 58, the purpose of which is described below.

Figure 9:
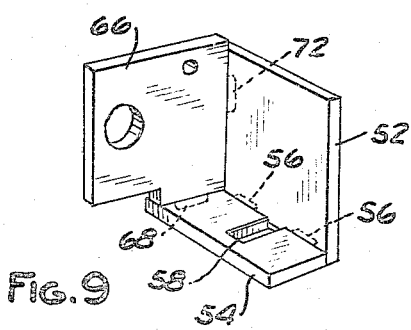
FIG. 9 is a perspective view illustrating the relation between certain of the moving parts.

Within block 36 is a pneumatic cylinder 60 and piston 62 having a piston rod 64 connected to a crosshead 66. The crosshead has a lug 68 engaged within a slot 70 in gate 54. The crosshead and plate 52 have an interengaged lug and slot 72 (FIG. 9). Thus, plate 52 and gate 54 are drivingly connected to piston rod 64 through crosshead 66.

Body 34 of the feeder device has a guideway 74 which extends preferably in a substantially straight line therethrough. The guideway has an upper portion 76 defined by inlet nipple 32, a second portion 78 between the inlet and gate 54, and a third portion 80 below the gate. This portion includes an opening through body member 38 and an outlet nipple 82 projecting from a plate 84 secured to body member 38 by suitable bolting (not shown). Flexible tube 30 connects to outlet nipple 82. In general, an article 24 advances gravitationally through guideway 74 in a number of successive steps.

Figure 7:
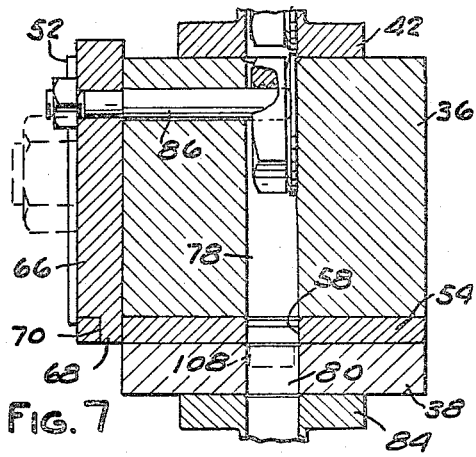
FIG. 7 is a sectional view on line 7—7 of FIG. 4.
Figure 6:
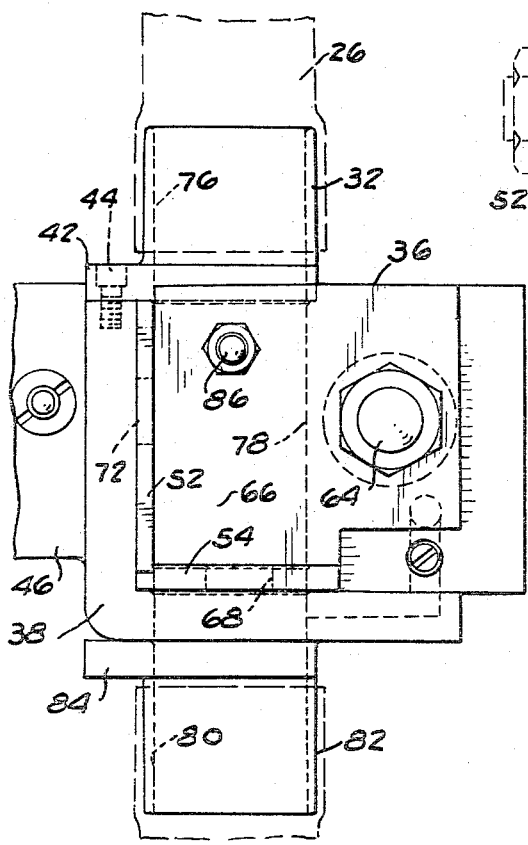
FIG. 6 is a generally plan view of the feeding apparatus looking in the direction opposite to that of FIG. 4.
Figure 8:
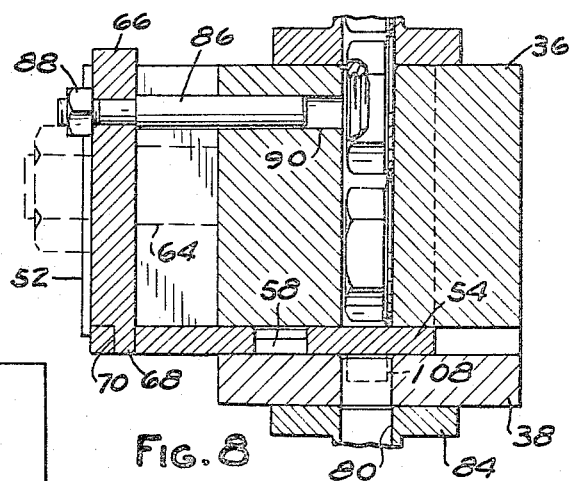
FIG. 8 is a view similar to FIG. 7 but showing a different position of certain of the parts.

A shouldered pin 86 is anchored on crosshead 66 by a nut 88, and this pin extends slidably a bore 90 within block 36. Upon reciprocation of the crosshead, pin 86 moves between an advanced position (FIG. 7) and a retracted position (FIG. 8). In the advanced position, the finger probes the opening of an article 24 to obstruct its movement through guideway 74 and in its retracted position releases the article. Gate 54 is in its advanced position when finger 86 is retracted (FIG. 8) to receive an article released by the finger and the gate is in its retracted position when finger 86 is advanced (FIG. 7) so that gate opening 58 passes the article downwardly toward tube 30.

Pneumatic cylinder 60 is closed by a cap 92 bolted to block 36 as at 94. Cap 92 has an opening 96 for reception of a threaded fitting 98 through which air under pressure is admitted into the cylinder for moving piston 62 to the left as FIG. 5 is viewed. Piston 62 is returned by a coil spring 99 when the pressure is released. Cap 92 has an internal radial slot 100 which communicates with a passageway 102 in block 36. Passageway 102 has continuations 104 and 106 formed in the block and in body member 38 respectively. Passageway portion 106 has a port 108 which opens into guideway portion 80 immediately below gate 54.

A valve pin 110 is slidably disposed in passageway 102 and is biased toward the left, as FIG. 5 is viewed, by a coil spring 112 in the passageway to prevent inner end 114 of pin 110 from bottoming against the righthand end portion of passageway 102. Outer end 116 of the valve pin engages and follows the movement of crosshead 66 to open and close passageway portion 104 to the passage of air under pressure. The amount of air passing through passageway 102–106 and through port 108 is controlled by a metering screw 118 (FIG. 5).

In use, it may be assumed that feeding system 20 has been assembled as shown and that hopper 22 is in operation so that it feeds a series of articles 24 into track 26. Articles 24 are illustrated as being of the type having a central recess or opening such as the flanged nuts shown. Air in cylinder 60 is atmospheric and piston 62, together with gate 54 and finger 56, are held to the right, as FIGS. 5, 7, and 8 are viewed, by coil spring 99. The lead article 24 in the track enters nipple 32 but is obstructed from passing through guideway portion 78 by finger 86.

During the first cycle of operation, when air is introduced into cylinder 60, piston 62, crosshead 66, gate 54, and finger 86 shift from the FIG. 7 position to the FIG. 8 position wherein gate 54 closes guideway 74. When finger 86 retracts, the first two articles in the series fall to the position of FIG. 8 where they are supported by gate 54. When air is relieved from cylinder 60, the parts are spring returned to the FIG. 7 position wherein finger 86 probes the opening in the second article 24. At the same time, the lead article is released when gate opening 58 is aligned with guideway 74, this article then falling through outlet nipple 82 into tube 30.

Upon the second and each subsequent cycle of operation, the lead article is released by finger 86 to fall upon closed gate 54, and this article is released for entry into tube 30 through gate opening 58 when finger 86 again returns to probe the succeeding article and support it.

Each time compressed air is introduced into cylinder 60, air under pressure passes through slot 100 in cap 92 into passageway 102. The air under pressure forces valve pin 110 to the left, as FIG. 5 is viewed, so that it follows the outward movement of crosshead 66. When gate 54 has closed guideway 74, inner end 114 of the valve pin opens passageway portion 104 so that air under pressure flows through passageway portion 106 and out of port 108 into lower guideway portion 80. Gate 54 provides a pneumatic closure for the guideway, thereby channeling the compressed air through outlet nipple 82 and into tube 30 for propelling an article therein to the delivery point.

When air pressure is relieved in cylinder 60, crosshead 66 forces valve pin 110 to the right as FIG. 5 is viewed and the valve pin closes passageway portion 104 before gate opening 58 aligns with guideway 74. Spring 112 prevents inner end 114 of the valve pin from bottoming against the right-hand end portion of passageway 102 to insure that end portion 114 will be subjected to air under pressure in each cycle of operation of the feeder device.

It will be understood that whenever an article 24 is needed at the delivery point, suitable controls and valving (not shown) are actuated for introducing air under pressure into cylinder 60 and then relieving it so that feeder device 28 furnishes an article to the delivery point upon demand.

The surfaces defining guideway portions 76, 78, 80 all have relatively close tolerances with respect to articles 24 being fed therethrough for the purpose of maintaining them in their desired attitude and preventing them from tilting or cocking therein. Such tilting or cocking would result in a likelihood of the article becoming jammed within the feeder device.

To the contrary, the interior surfaces of tube 30 have considerably greater tolerance with respect to articles 24. This tolerance is still small enough to maintain the article in its sideways orientation as it passes through the tube but is great enough to allow the tube to be passed around relatively sharp corners without binding on the articles passing therethrough. Also, this greater tolerance is adequate to permit a significant amount of the propelling air in the tube to escape past an article being propelled. This reduces the amount of propelling force on the article and prevents its acceleration to a velocity so great that it would damage itself or equipment to which it is delivered at the delivery point.

Tolerances between articles 24 and track 26 need not be as close as the tolerances in the rigid guideway 74. Advantageously, track 26 can be formed of tubing identical to tubing 30.

In passing through feeder device 28, an article moves through a succession of relatively short distances so that the device can be cycled rapidly with assurance that a part will be deposited in tube 30 during each cycle. Specifically, an article first drops a short distance from finger 86 onto gate 54. In the apparatus illustrated, this distance is not significantly more than the diameter of the article itself. Then, the article falls a short distance through outlet nipple 82 into tube 30. The time required for movement of the part through each of these steps is small; therefore, the device can be cycled rapidly.

The feeder device illustrated is capable of sustained, reliable operation through tens of thousands of cycles at a cyclic rate of about 100 per minute. However, in actual use, the feeder is normally coordinated with a powered nut runner or other tool which cannot apply the articles to a work as rapidly as the feeder device can feed them. Actual nut feeders in accordance with this invention operate over sustained periods at a rate of between 60 and 70 cycles per minute.

Feeder device 28 is particularly well adapted for use with relatively large diameter articles 24, since the articles pass therethrough in substantially a straight line. It is not necessary to shuttle the articles from alignment with inlet 32 to an offset position in alignment with an outlet. Thus, even though the articles have relatively large diameter, the feeder device can be kept relatively small, lightweight, and inexpensive.

Feeding system 20 can be mounted at floor or table level at any convenient location and need not be immediately adjacent the equipment to which articles 24 are delivered by tube 30. In numerous applications, the hopper and feeder device have been installed up to 20' away from the delivery point. Tube 30 can be passed around corners, up over obstacles, and down to a delivery point, or through almost any tortuous path. The delivery end of tube 30 need not be attached to stationary equipment but can be attached to mobile equipment, since the tube can flex to follow movements of such equipment. The tube can be twisted to deliver articles in any rotative orientation relative to that in which it passes through feeder device 28.

Figure 10:
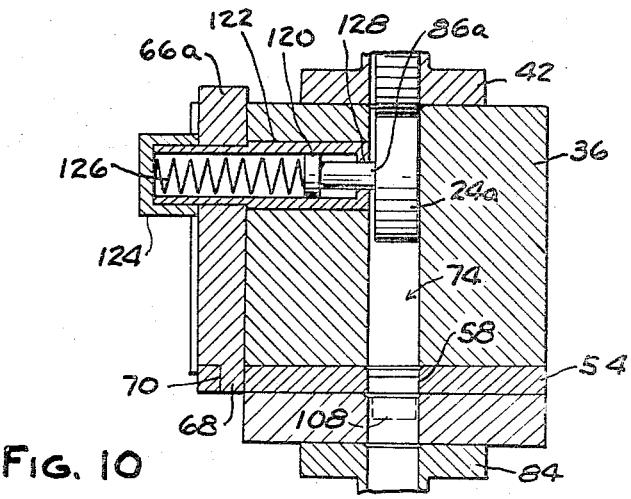
FIG. 10 is a fragmentary view similar to FIG. 7 but showing a modified escapement finger.
Figure 11:
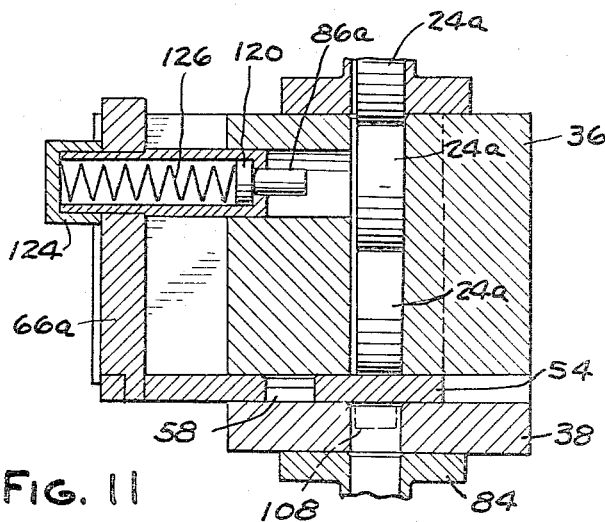
FIG. 11 is a view similar to FIG. 10 but showing the parts in a different position.

The structure shown in FIGS. 10 and 11 is, in general, similar to that described above, except that it is adapted for use with articles 24a, such as discs, which have no opening or recess for reception of a probe or finger 86. In this case, finger 86a has a head 120 slidably disposed within a tubular guide 122 connected to crosshead 66a by a threaded cap 124 which also closes the end of the tube. A coil spring 126 seated against the cap and head 120 biases finger 86a out of an opening 128 into frictional engagement against article 24a. Opening 128 is smaller than head 120, as shown, so that it is contained within guide 122 when the finger is retracted, as shown in FIG. 8.

The functioning of this structure is similar to that described above, except that finger 86a obstructs movement of an article 24a through guideway 74 by frictional engagement rather than a probing action as in the case of finger 86.

I claim:
1. Apparatus for feeding one at a time from a source to a delivery point a series of articles each having surface portions by engagement with which said article is orentable in a predetermined attitude, said apparatus comprising,
 a track, and means operable to introduce said articles into said track in a predetermined attitude,
 means defining a guideway having an upper end portion positioned for reception of an article from said track,
 said guideway extending downwardly to a lower end portion so that a received article passes gravitationally therethrough,
 a flexible tube having a passageway therein extending to said delivery point, means mounting said tube so that said passageway is positioned to receive an article from said lower end portion of said guideway,
 said track, guideway, and passageway having control surfaces which are operative by engagement with said surface portions of said articles to maintain said articles in substantially the same predetermined attitude with respect to their direction of travel,
 finger means mounted for movement to an advanced position for engagement with an article adjacent said upper end portion of said guideway and to a retracted position for disengaging the article,
 said finger means in said advanced position providing an obstruction to movement of the engaged article through said guideway,
 gate means below said finger means mounted for movement to an advanced position for closing said guideway and to a retracted position for opening said guideway,
 motor means operable to move said finger means and gate means to said advanced and retracted positions thereof respectively in alternate sequence so that said finger means and gate means cooperate to form an escapement which admits articles one at a time to said passageway, and said gate means forms a transitional support for articles in said guideway,
 means operable when said gate means is in said advanced position to introduce air under pressure into said guideway below said gate means and to discontinue said pressure when said gate means is in said retracted position thereof,
 said gate means in said advanced position thereof forming a pneumatic closure for the guideway so that said air under pressure is contained for propelling an article through said passageway to said delivery point.

2. The apparatus defined in claim 1 wherein said track has a portion adjoining said upper end of said guideway, said track portion and said guideway extending in a substantially straight line.

3. The apparatus defined in claim 1 wherein the spacing between said finger means and gate means is such that an article supported by said gate means in said advanced position thereof is immediately adjacent an article in said guideway in a position to be engaged by said finger means.

4. The apparatus defined in claim 1 wherein said track has a substantially rigid portion adjacent the upper end portion of said guideway, said guideway being substantially rigid, said control surfaces of said track portion and guideway having relatively close tolerances with respect to the surface portions of the article by engagement with which they are maintained in their predetermined attitude, whereby to control the article attitude accurately in transition through said track portion and guideway, said control surfaces of said passageway in said flexible tube having relatively greater tolerances with respect to said article surfaces to facilitate curving of said tube without binding against articles passing therethrough and to facilitate escape of air past articles propelled thereby in said tube.

5. The apparatus defined in claim 1 wherein said track is formed in part by a flexible tube having a longitudinal passageway therein which extends between said rigid track portion and said means operable to introduce articles into said track.

6. The apparatus defined in claim 5 wherein said flexible tubes have substantially similar passageway configurations.

7. Apparatus for transferring a series of articles one at a time from a track into a pneumatic tube comprising,
 a body having a substantially straight guideway extending therethrough, said guideway including an inlet adapted to be attached to a track for the reception of articles and extending downwardly to an outlet adapted to be connected with a pneumatic tube to which articles are to be delivered,
 finger means within said body mounted for movement to an advanced position for engagement with an article in said guideway adjacent said inlet and to a retracted position for disengaging the article,
 said finger means in said advanced position providing an obstruction to movement of the engaged article within said guideway,
 gate means within said body mounted for movement to an advanced position for closing said guideway and to a retracted position for opening said guideway, said gate means being disposed between said finger means and guideway outlet,
 motor means mounted on said body and being operable to move said finger means and gate means to said advanced and retracted positions thereof respectively in alternate sequence, so that said finger means and gate means cooperate to form an escapement which admits articles one at a time to said guideway outlet and said gate means forms a transitional support for articles in said guideway, means operable when said gate means is in said advanced position to introduce air under pressure into said guideway below said gate means and to discontinue said pressure when said gate means is in said retracted position thereof, said gate means in said advanced position thereof forming a pneumatic closeure for the guideway so that said air under pressure is directed through said outlet for propelling an article through a tube with which said outlet is adapted to be connected.

8. In combination with the apparatus defined in claim 7, a track connected with said guideway inlet, and means operable to introduce a series of articles into said track, and a pneumatic tube connected with said guideway outlet.

9. Apparatus for feeding one at a time from a source to a delivery point a series of articles each having surface portions by engagement with which said article is orientable in a predetermined attitude, said apparatus comprising, a track, and means operable to introduce said articles into said track in a predetermined attitude, a body having a substantially straight guideway extending therethrough, said guideway including an inlet connected with said track for the reception of articles, said guideway extending downwardly to an outlet so that articles pass gravitationally from said inlet to said outlet, a flexible tube having a passageway therein, said tube being connected with said outlet with said passageway aligned for reception of articles from said outlet, a finger and a gate reciprocably mounted on said body, reciprocable motor means on said body having an operative connection with said finger and gate, said finger having an advanced position for engagement with an article in said guideway adjacent said inlet and a retracted position for disengaging the article, said finger, in said advanced position, providing an obstruction to movement of the engaged article within said guideway, said gate being disposed between said finger and guideway outlet and having advanced and retracted positions respectively for closing and opening said guideway, said motor means being operable to move said finger and gate to said advanced and retracted positions thereof respectively in alternate sequence so that said finger and gate cooperate to form an escapement which admits articles one at a time to said passageway, and said gate forms a transitional support for successive articles in said guideway, said body having a duct for air under pressure with an outlet disposed below said gate, valving associated with said duct operable when said gate means is in said advanced position to pass air under pressure through said duct and to discontinue the same when said gate is in said retracted position thereof, said gate, in said advanced position thereof, forming a pneumatic closure for the guideway so that said air under pressure is contained for propelling an article through said passageway, said track, guideway, and passageway having control surfaces which are operative by engagement with said surface portions of said articles to maintain said articles in substantially the same predetermined attitude with respect to their direction of travel, the tolerance between said passageway control surfaces and articles passing therethrough being relatively greater than control surfaces in said guideway so that said tube can be curved without binding against articles passing therethrough and so that propelling air in said tube escapes past articles propelled thereby in said tube.

10. The apparatus defined in claim 9 wherein the spacing between said finger and gate is such that an article supported by said gate in said advanced position thereof is immediately adjacent an article in said guideway in a position to be engaged by said finger.

References Cited by the Examiner

UNITED STATES PATENTS

| 846,806 | 3/1907 | Skipp | 221—290 X |
|---|---|---|---|
| 871,291 | 1/1908 | Blakeslee | 221—290 X |
| 2,544,165 | 3/1951 | Krasnow | 221—299 X |
| 2,558,633 | 6/1951 | Tuttle | 221—299 X |
| 2,657,404 | 11/1953 | Kasper | 221—291 X |
| 2,658,199 | 11/1953 | Ayres | 221—299 X |
| 2,937,788 | 5/1960 | Darsie | 221—298 |
| 3,038,637 | 6/1962 | Zakrzewski | 221—299 X |
| 3,163,324 | 12/1964 | Lupo | 221—68 |

FOREIGN PATENTS

| 936,658 | 2/1948 | France. |
|---|---|---|
| 331,360 | 11/1935 | Italy. |

SAMUEL F. COLEMAN, *Primary Examiner.*